Feb. 2, 1960 J. R. HENSLER 2,923,624

METHODS OF MAKING RETICLES

Filed Sept. 15, 1954

INVENTOR.
JOSEPH R. HENSLER
BY M. A. Ellestad
W. E. Recktenwald
ATTORNEYS

United States Patent Office 2,923,624
Patented Feb. 2, 1960

2,923,624

METHODS OF MAKING RETICLES

Joseph R. Hensler, Brighton, N.Y., assignor to Bausch & Lomb Optical Company, Rochester, N.Y., a corporation of New York Application September 15, 1954, Serial No. 456,224

9 Claims. (Cl. 96—35)

This invention relates to improved reticles and the like and more particularly to methods of making same.

Present-day reticles and the like are manufactured in many ways. For example, in one method a master reticle design is ruled onto a base and reproductions thereof are made photographically on a surface of a glass plate. This method of manufacture requires the use of expensive photographic equipment to produce a reticle that is not completely satisfactory since the photographically reproduced markings are easily scratched from the surface.

Another type of reticle is manufactured by engraving the surface of a glass plate with a reticle design. The engravings are then filled with a material that contrasts in color with the glass. Although this method of manufacture is reasonably practical, the reticle that results has objectionabe parallax when viewed from certain angles.

A third common type of reticle is manufactured by etching the reticle design into the surface of the glass. This method is also practical, but the resulting reticle has the disadvantage of also having parallax when used.

It is therefore an object of this invention to provide an improved method of manufacturing a reticle or the like that overcomes the disadvantages of the known prior devices and produces a reticle of excellent physical properties.

It is another object of this invention to provide an improved method of manufacturing a reticle that is comparatively simple, relatively inexpensive and highly efficient.

It is a further object of this invention to provide an improved method of forming the reticle markings as an integral part of the glass plate.

It is a still further object of this invention to provide an improved method for making reticles that have anti-reflecting transparent surfaces.

These and other objects and advantages reside in certain novel features of the methods, steps and processes as will hereinafter be more fully described and pointed out in the appended claims.

Referring to the drawing.

Figure 1:
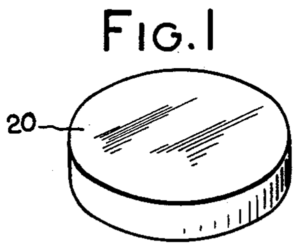
Fig. 1 is a perspective view of a transparent glass plate having a polished surface on one side thereof.
Figure 2:
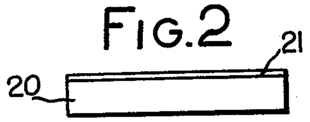
Figs. 2, 3 and 4 are cross-sectional views of the plate of Fig. 1 showing successive steps in the preferred method of making a reticle.
Figure 3:
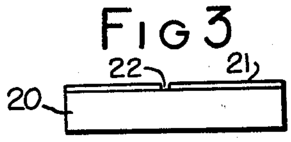
Figure 4:
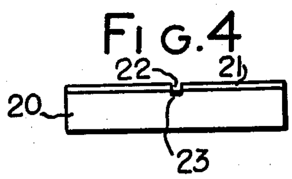

As shown in Figs. 1–4 of the drawing, a transparent glass plate 20, formed from glass containing at least 15% by weight of lead oxide, is ground and polished on both surfaces. All lead glasses containing more than 15% by weight of lead oxide are effective when used in this method. Therefore, when the term "lead glass" is used throughout this specification and in the claims, it is to be understood to include all glasses containing at least 15% by weight of lead oxide.

The polished plate 20, after being placed in a conventional vacuum evaporation system, is coated with a thin transparent film 21 of material that is inert in and impenetrable to an atmosphere of hot hydrogen gas. Several materials are available and satisfactory for this film, such as magnesium fluoride, aluminum, titanium dioxide, and the metal alloy known as "Inconel" which comprises by weight at least 72% nickel, 14–17% chromium, 6–10% iron and no more than 0.15% carbon.

A reticle design 22 is engraved through said transparent layer 21 of material by removing portions of said material to expose the underlying surface of the plate 20. This engraving may be carried out by the usual engraving procedures.

The coated and engraved plate 20 is next placed in an air tight chamber in a furnace. The air tight chamber has an inlet and an outlet for the ingress and egress of hydrogen gas. The temperature of the furnace and plate is raised to a preselected temperature whereupon hydrogen gas, which also has been heated to the same preselected temperature as the glass plate 20, is allowed to flow into and fill the air tight chamber forming an atmosphere of heated hydrogen gas around said glass plate. The heated hydrogen gas is allowed to flow from the air tight chamber at about the same rate as it enters. The heated hydrogen gas reacts with the lead in the exposed surface of the heated lead glass plate to reduce the lead in said exposed surface. Said reduction may be either partial whereby the light transmission qualities of the glass in the exposed areas will be partially reduced or the reduction may be complete so that the exposed areas of the glass plate become opaque. Since the transparent layer 21 of material is inert in and impenetrable to the heated hydrogen gas, the surface of the glass plate underneath the layer of material will be unaffected by the hydrogen gas and will remain transparent so that the resulting reticle will have a transparent background with an opaque or partially transmitting reticle design 23 permanently delineated thereon. The term "reticle" when used throughout this specification and in the claims is understood to mean any transparent plate formed of glass or the like having lines thereon in the form of a predetermined pattern and is to include haemacytometers and the like.

Although all lead containing glass having more than 15% by weight of lead oxide will be operative when used with this method, it has been found that 33% to 45% by weight of the lead oxide is the most effective and satisfactory range. More than 45% or less than 33% by weight of the lead oxide will affect the time required to accomplish the desired degree of reduction necessary to produce an effective reduction of the lead in the exposed portion of the plate.

The effective temperature range within the furnace for the hydrogen gas and glass plate is usually above 350° C. and below the softening point of the glass plate. Depending on the temperature of the hydrogen gas and the percent by weight of lead oxide in the glass plate, the length of time of exposure will vary from approximately two hours to several hours.

One example of a successful method of making a reticle design on a lead glass plate 20, as illustrated in Figs. 1–4, comprises selecting a glass plate 20 containing between 33% and 45% by weight of lead oxide, coating said plate in a vacuum system with a thin film 21 of magnesium fluoride at least 50 mμ thick, engraving a recticle design 22 through said coating of magnesium fluoride to expose a portion of the surface of the plate, heating and exposing the engraved and coated plate to an atmosphere of heated hydrogen gas, said gas being maintained at a temperature of approximately 450° C., for a period of four hours. This method will produce a recticle having a transparent background around an opaque reticle design 23 that is permanently and stably formed in the surface of the lead glass plate 20.

The reflection from the transparent portions of the recticle may be reduced by the regular anti-reflecting coatings which may be applied, for example, in accordance with the procedures described in Cartwright et al. Patent No. Re. 22,076 of April 21, 1942. However, only those regular anti-reflecting coatings that are inert in and impenetrable to an atmosphere of heated hydrogen gas will be effective when used as the coating 21. Magnesium fluoride is one such material that is not only inert in and impenetrable to heated hydrogen gas but also fulfills the requirements of the Cartwright et al. patent supra.

A magnesium fluoride film to be inert in and impenetrable to an atmosphere of heated hydrogen gas must be at least 50 mμ and not over 250 mμ thick. To come within the teaching of the Cartwright et al. patent supra and produce an anti-reflecting type film, the magnesium fluoride film msut be approximately 100 mμ thick measured in green light. Therefore, for a magnesium fluoride film 21 to be not only inert in and impenetrable to an atmosphere of heated hydrogen gas but also to have anti-reflecting properties as above described, it must be deposited approximately 100 mμ thick. When the transparent portion of the reticle is coated with an anti-reflecting type material, the reflections from said portion will be materially reduced permitting the reticle to be used under conditions of reduced illumination.

Figure 5:
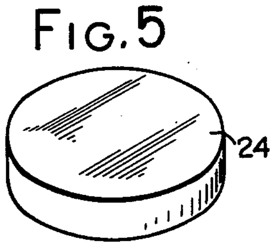
Fig. 5 is a perspective view of another transparent glass plate having a polished surface on one side thereof.
Figure 6:
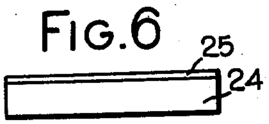
Figs. 6, 7, 8, 9 and 10 are cross-sectional views of the plate of Fig. 5 showing successive steps in a modified method of making a reticle.
Figure 7:
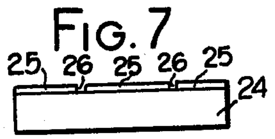
Figure 8:
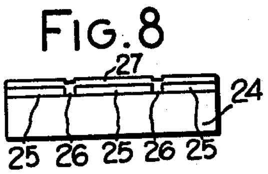
Figure 9:
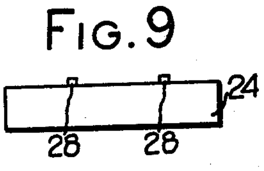
Figure 10:
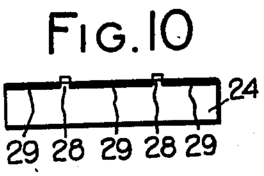

Another form of the invention is shown in the drawings in Figs. 5–10 wherein a glass plate 24 is coated with a layer of soluble substance 25, such as fish glue which is soluble in water or polyvinylchloride or copolymers thereof soluble in ketones or tetrahydrofurans. A reticle design 26 is engraved into the soluble substance 25 by removing a portion thereof from the underlying surface of plate 24. The resulting plate and engraved layer of soluble substance 25 are then coated with a layer of material 27 inert in and impenetrable to an atmosphere of hot hydrogen gas, such as magnesium fluoride. After coating, the plate 24 is immersed in an appropriate solution for dissolving the soluble substance 25 and thereby removing the overlying layer of material 27 so that the surface of the plate will have the reticle design 28 embossed thereon in said inert material. The embossed plate is then exposed to an atmosphere of heated hydrogen gas for a selected period of time sufficient to reduce the lead in the uncoated surface of the plate, thereby forming a reticle having an opaque or partially opaque background 29 and a transparent reticle design 28.

Figure 11:
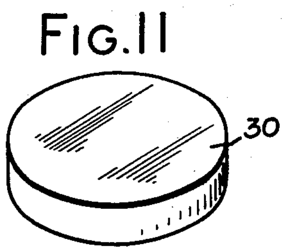
Fig. 11 is a perspective view of still another transparent glass plate having a polished surface on one side thereof.
Figure 12:
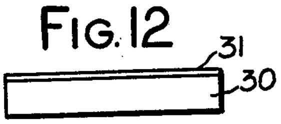
Figs. 12, 13, 14, 15, 16 and 17 are cross-sectional views of the plate of Fig. 11 showing successive steps in a further modified method of making a reticle.
Figure 13:
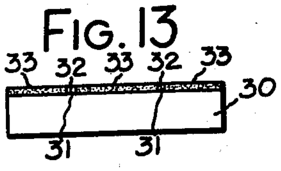
Figure 14:
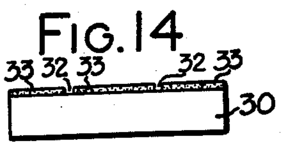
Figure 15:
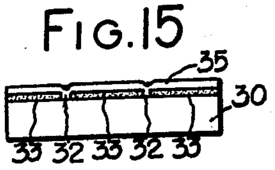
Figure 16:
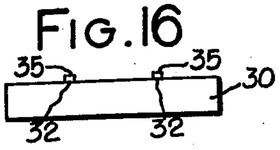
Figure 17:
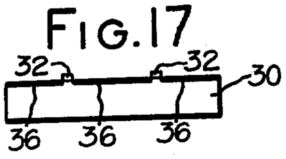

A third form of my method of making a reticle is shown in Figs. 11–17 of the drawings wherein a polished surface of the lead glass plate 30 is covered with a layer of photosensitive emulsion 31. A mask in the form of a pattern of a reticle design 32 is placed over the layer of emulsion 31 which is then exposed to ultraviolet light whereby the portion 33 of the layer of emulsion on the plate not covered by the mask is exposed and becomes insoluble in water. The plate and layer of emulsion are immersed in water to dissolve the unexposed portions 32 of the emulsion 31. The exposed portions of plate 30 and exposed portion 33 of the emulsion 31 are next coated with a film of material 35 that is inert in and impenetrable to an atmosphere of hot hydrogen gas. The plate 30 and superposed layer of exposed photosensitive emulsion 33 and inert and impenetrable film of material 35 are immersed in an alkaline solution to dissolve the exposed emulsion 33 and thereby remove the overlying film 35 of inert material so that the plate will have the reticle design 32 formed from the film of inert material 35 delineated on its surface. The plate is next exposed to an atmosphere of hot hydrogen gas for a selected period of time to reduce the lead in the exposed surface of the plate whereby a reticle is formed having an opaque or partially opaque background 36 and a transparent reticle design 32 delineated on the surface of the plate. The coating of inert material 35 may be magnesium fluoride, titanium dioxide, aluminum, the alloy known as "Inconel" or the like.

When the lead glass plate is subjected to the heated hydrogen gas for a short period of time, the lead in the exposed or unprotected portions on the surface thereof will be only partially reduced so that such portions will pass only a part of the incident light. If the plate is subjected to hot hydrogen gas long enough, the lead in the exposed portions of the glass surface will be completely reduced so that such portions become opaque. The stage of reduction in which only part of the incident light is transmitted is especially important in making haemacytometers having transparent lines with only a partially transparent background or partially transparent lines with a transparent background. If the entire surface of the lead glass plates 20, 24 and 30 are subjected to hot hydrogen gas, the lead in the under surfaces thereof will, of course, also be reduced so that these under surfaces will have to be cleared by grinding and polishing in order to render the reticle useful, as will be apparent to anyone skilled in the art.

From the foregoing, it will be apparent that I am able to attain the objects of my invention and provide an improved method of making a reticle that has the reticle design permanently formed in the surface of the glass plate. The steps of the method are comparatively simple and relatively inexpensive. Various modifications can obviously be made without departing from the spirit of my invention or the scope of the appended claims.

I claim:

1. The method of producing an opaque reticle design on a transparent lead glass plate which comprises coating the surface of the plate with a thin transparent layer of magnesium fluoride, removing a portion of said layer of magnesium fluoride to expose the surface of the plate in the form of a reticle design, and heating said plate in hydrogen gas whereby the lead in the exposed surface of the plate will be reduced by said hydrogen gas to form the opaque reticle design permanently into the surface of the plate.

2. The method of producing an opaque reticle design on a transparent lead glass plate which comprises coating the surface of the plate with a thin layer of magnesium fluoride at least fifty and not over two hundred and fifty millimicrons thick, engraving a reticle design in said layer of material by removing portions of said material to expose the underlying surface of the plate and heating said plate for a period of time in hydrogen gas whereby the lead in the surface of the plate exposed by the engraved reticle design will be reduced to form the reticle design permanently in the surface of the plate.

3. The method of producing on a transparent lead glass plate a reticle having portions thereof of different light transmitting characteristics which comprises covering the surface of the plate with a thin layer of soluble substance,, forming a reticle design in said layer by removing some of the substance to expose parts of the surface of the plate, coating the remaining layer of soluble substance and exposed surface of the plate with an evaporated film of material of any one of the group of masking materials magnesium fluoride, aluminum, titanium oxide and a metal alloy comprising by weight at least 72% nickel, 14–17% chromium, 6–10% iron, and no more than 0.15% carbon. which is inert in and impenetrable to an atmosphere of heated hydrogen gas, dissolving the soluble substance from the plate to thereby remove its superposed layer of material so that only the reticle design formed by the material remains on the plate, and heating the plate in hydrogen gas so that the lead in the exposed surface of the plate is reduced and the material coated portion of the plate remains transparent to form a transparent reticle pattern having an opaque background.

4. The method of producing a reticle design on a lead glass plate which comprises the steps of covering a polished surface of the plate with a layer of photosensitive emulsion, masking the covered plate with a pattern of a reticle design, exposing said unmasked portions of the plate to ultraviolet ligh whereby said exposed portions of the emulsion become insoluble in water, immersing the plate in water to dissolve the unexposed emulsion from the surface of the plate, applying a coating of material of any one of the group of masking materials magnesium fluoride, aluminum, titanium oxide and a metal alloy comprising by weight at least 72% nickel, 14–17% chromium, 6–10% iron, and no more than 0.15% carbon that is inert in and impenetrable to an atmosphere of hot hydrogen gas to both the exposed emulsion on the plate and to the uncovered surface of the plate, immersing the plate in alkaline solution to dissolve the layer of exposed emulsion and its overlying coating of inert material so as to leave the reticle design lined on the plate, and heating the plate in hydrogen gas whereby the lead in the surface of the plate surrounding said inert material will be reduced and a transparent reticle design having an opaque background will be provided on the glass plate.

5. The method of producing a reticle design on a surface of a transparent lead glass plate which comprises defining a reticle design on the surface by covering selected areas thereof with a material of any one of the group of masking materials magnesium fluoride, aluminum, titanium oxide and a metal alloy comprising by weight at least 72% nickel, 14–17% chromium, 6–10% iron, and no more than 0.15% carbon which is inert in and impenetrable by hot hydrogen gas and reducing the lead in the uncovered areas of the surface by subjecting the plate to the action of hot hydrogen gas.

6. The method of producing a reticle design on a lead glass plate which comprises the steps of covering a polished surface of the plate with a layer of photosensitive emulsion, masking portions of the emulsion layer with a stencil having a reticle design, exposing the unmasked portions of the layer to ultraviolet light to render them insoluble in water, dissolving the masked portions of the layer by immersing the plate in water, applying a coating of material of any one of the group of masking materials magnesium fluoride, alminum, titanium oxide and a metal alloy comprising by weight at least 72% nickel, 14–17% chromium, 6–10% iron, and no more than 0.15% carbon that is inert in and impenetrable to hot hydrogen gas to the uncovered portions of the plate and the remaining portions of the layer, immersing the plate in an alkaline solution to remove the portions of emulsion layer remaining on the plate and exposing the plate to hot hydrogen gas whereby a reticle design will be formed by reducing the lead in the unprotected area on the surface of the plate.

7. The method described in claim 6 in which the coating of material is transparent.

8. The method of producing a reticle design on a surface of a transparent lead glass plate which comprises defining a reticle design on the surface by covering selected areas thereof with a material which is inert in and impenetrable by hot hydrogen gas and reducing the lead in the uncovered areas of the surface by subjecting the plate to the action of hot hydrogen gas, said material being magnesium fluoride having a thickness between 50 m$\mu$ and 250 m$\mu$.

9. The method of producing a reticle design on a lead glass plate which comprises the steps of covering a polished surface of the plate with a layer of photosensitive emulsion, masking portions of the emulsion layer with a stencil having a reticle design, exposing the unmasked portions of the layer to ultraviolet light to render them insoluble in water, dissolving the masked portions of the layer by immersing the plate in water, applying a coating of magnesium fluoride that is inert in and impenetrable to hot hydrogen gas to the uncovered portions of the plate and the remaining portions of the layer, immersing the plate in an alkaline solution to remove the portions of emulsion layer remaining on the plate and exposing the plate to hot hydrogen gas whereby a reticle design will be formed by reducing the lead in the unprotected area on the surface of the plate.

References Cited in the file of this patent

UNITED STATES PATENTS

| | | |
|---|---|---|
| 2,000,310 | White et al. | May 7, 1935 |
| 2,515,943 | Stookey | July 18, 1950 |
| 2,559,389 | Beeber et al. | July 3, 1951 |
| 2,559,969 | Kennedy | July 10, 1951 |
| 2,659,665 | Parsons et al. | Nov. 17, 1953 |
| 2,716,300 | Bopp | Aug. 30, 1955 |